United States Patent [19]

Horowitz et al.

[11] 3,880,580

[45] Apr. 29, 1975

[54] METHOD OF ACTIVATING POLYMERIC MATERIALS

[75] Inventors: Carl Horowitz; Leon Pinczuk; Michael Dichter, all of Brooklyn, N.Y.

[73] Assignee: Polymer Research Corporation of America, Brooklyn, N.Y.

[22] Filed: Sept. 14, 1973

[21] Appl. No.: 397,426

Related U.S. Application Data

[63] Continuation-in-part of Ser. No. 105,670, Jan. 11, 1971, abandoned.

[52] U.S. Cl. .................... 8/4; 8/168; 8/18; 8/31; 260/860; 260/874; 427/304
[51] Int. Cl. ............................................. C23c 3/00
[58] Field of Search ............... 117/47 A, 47 R, 118; 8/168, 180; 204/30

[56] References Cited
UNITED STATES PATENTS

| | | | |
|---|---|---|---|
| 3,401,049 | 9/1968 | Horowitz | 117/47 |
| 3,553,085 | 1/1971 | Heymann | 204/30 |
| 3,578,484 | 5/1971 | Walles et al. | 117/47 |
| 3,607,350 | 9/1971 | Rathsack | 117/47 |
| 3,698,931 | 10/1972 | Horowitz | 117/47 |

*Primary Examiner*—William E. Schulz
*Attorney, Agent, or Firm*—Steinberg & Blake

[57] ABSTRACT

The invention relates to the activation of polymers and more particularly to certain classes of high polymeric materials which are extremely difficult to dye or otherwise react with, whereby a functional group is linked to the surface of the polymeric material so that dyes, monomeric materials, etc., can be linked to the functional group and thereby linked to the polymeric material. More particularly, polymeric materials such as polyolefins, e.g., polypropylene, polyesters and polyvinylchloride are made susceptible to sulfonation by the deposition of colloidal silver on the surface thereof and are then sulfonated by means of a sulfonating agent in the presence of a hydrocarbon solvent, particularly a chlorinated hydrocarbon solvent. The resulting polymer, the surface of which has been sulfonated, can then be easily dyed or can be reacted with monomers or other dyeable polymers.

9 Claims, No Drawings

METHOD OF ACTIVATING POLYMERIC MATERIALS

CROSS-REFERENCE TO RELATED APPLICATION

This application is a continuation-in-part of our copending application Ser. No. 105,670, filed Jan. 11, 1971, entitled "Activation Of Polymers" now abandoned.

BACKGROUND OF THE INVENTION

It is well known that different classes of high polymeric materials are so extremely difficult to dye that as a practical matter they can be considered as being not susceptible to dyeing by one or more types of dyes. In addition, these materials have very poor adherent qualities, that is they do not possess the property of affecting a bond between solid surfaces, and they have a weak sealability. This is due to the fact that the polymer lacks functional groups which are also known as dye receptors or adhesive receptors with which the dye molecules or adhesive molecules may combine.

It is further known that it would be desirable to combine dye molecules or adhesive molecules by means of grafting. However, until the present there has been no industrially satisfactory manner of accomplishing this.

Among this group of high polymeric materials are the polyolefins, particularly polypropylene, the polyesters and polyvinylchloride.

In the case of polypropylene it is well known that such polymer, particularly the polypropylene which is partially or completely crystalline, can be melt spun into synthetic fibers having unusual physical properties. However, this polymer is subject to the abovementioned inherent disabilities which greatly restrict its utility, particularly in the fabrication of general purpose fibers and films.

While polyesters such as the polyethylene terephthalates and also polyvinylchloride can be more easily dyed than polypropylene, nevertheless, only limited types of dyes can be used and the color fastness is not always satisfactory.

SUMMARY OF THE INVENTION

Generally speaking, in accordance with the present invention, a polypropylene, polyester or polyvinylchloride, or other polymeric material which is extremely difficult to dye is subjected to sulfonation in order to change the surface non-polar structure thereof to a surface polar structure, after which the sulfonated polymer can then be further reacted for dyeing, adhesion purposes, attachment of monomeric groups by grafting, etc. The sulfonation of the polymer is accomplished by a sulfonating agent, however, in accordance with the present invention after colloidal silver is deposited onto the surface of the polymeric material and the sulfonating agent is applied while this surface is in contact with a hydrocarbon solvent, preferably a chlorinated hydrocarbon.

It is accordingly a primary object of the present invention to provide a method by which polyolefins, polyesters, polyvinylchloride and the like high polymeric materials can have functional groups grafted onto the surface thereof so as to permit dyeing and improve the adhesion and sealability without changing the basic properties of the polymer.

It is yet a further object of the present invention to improve certain of the properties of the polyolefins such as polypropylene, polyesters and polyvinylchloride by grafting of reactive groups such as functional polar monomers with a positive or negative charge or monomers onto the surface of the polymeric material, without changing the basic properties of the polymeric material itself.

It is a further object of the present invention to provide a method of attaching $SO_3$ groups to polymers such as polypropylene, polyesters and polyvinylchloride (i.e., to sulfonate the polymer) which $SO_3$ group is attached to the surface of the polymeric material and is then able to react with monomers or other chemical compounds to form grafts which become thus attached to the polymeric material at the surface thereof. Thus, the invention provides for the formation of the sulfonated form of the polymers which can be grafted or which can react with different monomers or other groups in order to obtain dyeable polymers or polymers with an improved adhesion ability, sealability and many other properties.

With the above and other objects in view, the present invention mainly comprises the pretreating of the high polymeric material with an aqueous solution of a water soluble silver salt and with a strong base such as an alkali metal hydroxide so that colloidal silver becomes deposited onto and into the surface of the polymeric material. This thus pretreated polymeric material is then reacted with a strongly ionic agent such as a strong acid (or Lewis acid) or strong base (i.e., a Lewis base) in the presence of a hydrocarbon solvent, whereby the corresponding ion from the strongly ionic material is grafted onto the surface of the polymeric material thus rendering the same easily reactable with reactive agents such as dyes and the like. It is preferred to use a sulfonating agent as the Lewis acid so that the $SO_3$ group is grafted onto the surface of the polymeric material.

The reaction between the strongly ionic agent and the pretreated polymer should take place in the presence of a hydrocarbon solvent, particularly a chlorinated hydrocarbon. This is best accomplished by dissolving the ionic agent in the solvent although it is also possible to dip the pretreated polymer in the hydrocarbon or chlorinated hydrocarbon solvent and then to contact the dipped polymer with the sulfonating agent as such or dissolved in another solvent.

It has been found that the use of the hydrocarbon solvent, particularly the chlorinated hydrocarbon solvent permits the reaction to proceed in a uniform and speedy manner. Apparently the hydrocarbon penetrates into the polymer and greatly increases the reactive surface and therefore the speed of reaction on the surface.

The pretreatment of the present invention wherein the polymeric material has colloidal silver deposited onto and into the surface thereof is extremely important since it not only activates the surface of the polymeric material for the subsequent sulfonation or the like, but it also has the effect of catalyzing the surface grafting.

This pretreatment method comprises the treatment of the surface of the polymeric material with a solution of a soluble silver salt followed by treatment with a strong base such as sodium hydroxide which causes colloidal silver and/or silver oxide to precipitate onto the surface of the polymeric material. The thus-treated surface of the polymeric material can then be subsequently treated with any strong acid or strong base to cause the grafting of the corresponding ion onto the polymeric material which then can be easily dyed or otherwise treated. The strong acid or strong base actually acts as an ionic graft initiator for the grafting of monomeric material and/or dyes onto the polymer.

The strong bases which are used to precipitate the colloidal silver onto the surface of the polymeric material are preferably the alkali metal hydroxides, namely sodium hydroxide, potassium hydroxide, lithium hydroxide, rubidium hydroxide and cesium hydroxide. Sodium hydroxide is of course most preferred for reasons of economy and availability.

The strong acids which are used for the grafting of the ion onto the pretreated surface of the polymeric material, that is the strong Lewis acids, include the commonly usable sulfonating agents such as sulfuric acid, chlorosulfonic acid, sulfurous acid, sulfur dioxide, sulfur trioxide, fuming sulfuric acid, sulfuryl chloride and pyrosulfuryl chloride, as well as other Lewis acids such as anhydrous aluminum chloride, oleum, etc.

Among the Lewis bases which may be used are the above previously mentioned alkali metal hydroxides as well as sodium metal solution in naphthalene, sodium metal solution in liquid ammonia, sodium methoxide, sodium ethoxide, etc.

Among the suitable chlorinated hydrocarbons which may be utilized as the medium for carrying out the sulfonating reaction are: ethylene dichloride, methylene dichloride, triethylene chloride, carbon tetrachloride, methyl chloride, chlorobenzene, dichlorobenzene, etc.

The sulfonation reaction proceed extremely rapidly even at room temperature, so that it is unnecessary to set forth special conditions for the sulfonation.

Although the invention is not meant to be limited as to any particular theory of action, the following description of the mechanism of the graft polymerization according to the invention is given for fuller and better understanding of the invention.

Before setting forth the mechanism of cationic graft polymerization, it is noted for review that a Lewis acid is a compound capable of accepting electrons and is therefore known is an electron acceptor. A Lewis base, on the other hand, is known to be a compound capable of donating electrons or is known as an electron donator. Thus, the further discussion will make it clear why the Lewis acid or Lewis base can be used for the purposes of the present invention.

The mechanism of cationic graft polymerization according to the present invention proceeds, assuming a polyolefin for simplicity, in accordance with the following:

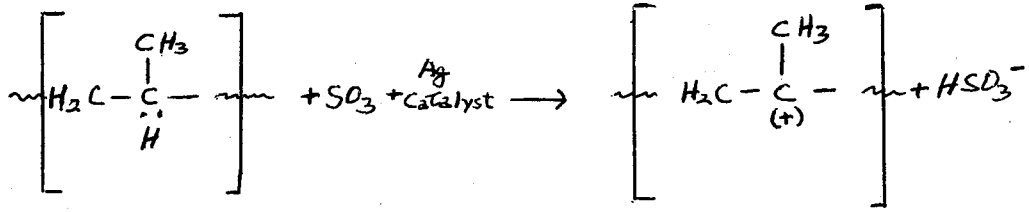

As is clear from the above, the sulfur trioxide removes the hydrogen with two electrons from the polymeric polyolefin, thus creating a deficiency of two electrons or a positive ion (the so-called carbonium ion) with $HSO_3$ as the Gegenion. In this reaction the silver acts as a catalyst for the reaction. Actually, an ion pair is formed with positive and negative charges partially dislocated.

A vinyl monomer has a double bond or four electrons of which two are in an elliptical sigma orbital and the other two in number "8" shaped pi orbitals.

The sigmi orbital is stable and does not react. The pi orbitals are unstable and when the monomer is brought into the vicinity of the carbonium ion, it donates its two pi electrons forming a covalent bond. An electron deficiency or a new carbonium ion is formed at the opposite end of the vinyl monomer, as per the following:

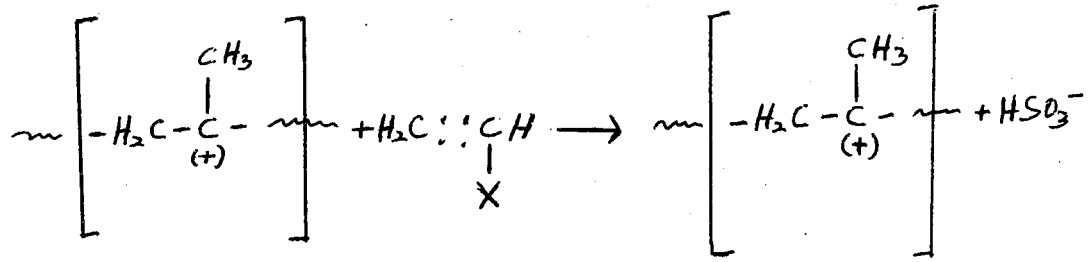

This reaction can repeat itself with more monomer and the formation of a side chain or a graft of the vinyl monomer which takes place on the backbone or the pre-existing substrate material. Here the silver acts as a catalyst for the formation of an ion pair.

The above reaction was illustrated with respect to $SO_3$ or sulfuric acid. However, it is not necessary to use only sulfuric acid. Anhydrous aluminum chloride or any Lewis acid or electron acceptor can be used. Conversely, a Lewis base or an electron donor can be used with the formation of an excess of two electrons (carbonium) on the backbone of the substrate molecule.

It is important that the monomer donates its two electrons to the carbonium ion of a substrate or that the monomer utilizes the two excess electrons of the carbonium to form a single covalent bond between the substrate and the monomer. This is the first step in graft formation. From this point on propagation by an ionic mechanism takes place the same as in ionic polymerization of monomers.

The sulfonated surface of the polymer can be very easily dyed with the dye after being grafted with the monomer by cationic grafting. Thus a strong acid group is attached to the molecule of the polymer rendering the entire molecule strongly acidic. When a monomer is brought into contact with such strongly acid polymer instantaneous polymerization takes place and the formed new polymer becomes strongly attached to the substrate and cannot be removed by leaching with solvent, thus proving that a chemical bonding or grafting takes place.

Among the monomers that may be reacted with the thus treated polymer are the following:

ethyleneimine, hydroxyethyl methacrylate, dimethylaminoethyl methacrylate, product of quaternization of 1-chloro 2-hydroxy propyl methacrylate and trimethyl amine, 2-vinyl pyridine, 2-ethyl vinyl pyridine, 2-methyl 5-vinyl pyridine, ethyl acrylate, butyl acrylate, acrylonitrile, ethyl fumarate, 2-isopropenyl pyridine, vinyl chloride, vinyl pyrrolidene, N- methylol methacrylamide, acrylic acid, N- isopropyl acrylamide, vinylidene chloride, vinylidene bromide, vinyl bromide, hydroxypropyl methacrylate and ethyl hexylacrylate, Methyl Methacrylate and its derivatives (also oleyl, n - decyl, octadecyl, cyclohexyl, n - butyl, amyl, cetyl acrylates and others), acrylic acid and its derivatives (also butyl, amyl, octyl hexadecyl, etc.), methylacrylate and its derivatives, methacrylic acid and its derivatives, vinyl acetate, vinyl chloride, vinylidene chloride, isobutylene vinyl ethers, acrylonitrile, maleic acid and esters, crotonic acid and esters, itoconic acid and its esters, allylic esters, allyl vinyl esters vinylpyridine and its derivatives (also 2 - methyl - 5 - vinyl pyridine), bis-betachloro ethyl vinyl phosphonate, chloroprene, isoprene, dimethylaminethyl, methacrylate, styrene, 1,3-butylene dimethacrylate, isoctyl vinyl ether, acrylamide, glycidyl methacrylate, N-vinyl caprolactam, N-vinyl pyrrolidone, N-vinyl carbazole, sodium styrene sulfonate, sodium vinyl sulfonate, bis(betachloroethyl) vinyl phosphonate, cetyl vinyl ether, divinyl ether of ethylene glycol, divinyl ether of butanediol, vinyl toluene, vinyl acetate, octadycyl vinylether. Also mixtures of two or more monomers can be used. The monomeric tertiary amines can be quaternized with benzyl chloride, ethyl iodide, methyl or ethylsulfate. Conversely, monomeric chlorides can be quaternized with tertiary amines to give quaternary ammonium compounds. Some suitable tertiary amines are: N-ethyl morpholine, pyridine, cetyldimethyl pyridine, dimethyl aniline, etc., mono, - di, tri-, tetra-and poly-ethylene glycol-dimethacrylate, methylvinylpyridine, allylcrylate and methacrylate, allychloride, allylacohol, perfluoro alkylacrylates and methacrylates, p-amino-styrene, vinyl bromide and vinylidene bromide trimethylvinylbenzylammonium chloride, vinyltrifuloroacetate (followed by hydrolysis to poly-vinyl alcohol), diallyl chloromethyl phosphonate, diallyl benzene phosphonate, diallyl dimethyl ammonium chloride, diallyl ethylene glycol, -diethyleneglycol - and polyethylene glycol acrylates and methacrylates, vinyl perfluoro octaneate, can also be treated in accordance with the method of this invention.

The above described mechanism of graft polymerization will apply to all types of substrates so that although the invention is particularly advantageous in connection with the treatement of polypropylene, polyesters and polyvinylchloride in order to make these relatively non-reactable polymeric materials easily dyeable and alike, it is to be understood that the method can be carried out on all synthetic polymers, as well as natural polymers and inorganic materials and metals.

Examples of synthetic polymers are: Banlon, nylon, Dynel polyvinyl copolymer, polypropylene, polyethylene, polyolefins, polyvinyls, polycarbonates, polyacrylics, cellulose acetate, triacetate and proprinate, Teflon and Kelef polyfluoroethylenes and chloroethylenes, polyvinylalcohol, Fortrel, Encron, Dacron and Kodel polyesters, Spandex polyurethane, Acrilan, Creslan and Orlon acrylics, Caprolan polyamide, polystyrene, Styrofoam, Lucite and Plexiglass methylmethacrylates, Nomex polyamide, Vinyon polyvinyl, polyisobutylene, Bakelite phenol formaldehyde, urea formaldehyde resin.

Examples of natural polymers are: cotton, linen, ramie, wool, silk, paper pulp cellulose, wood, proteins polypeptides, leather, hair, human skin, tissue hair and bone, waxes, petroleum fractions, coal coke, carbon.

Examples of inorganic materials are:

Fiberglass, glass, ceramic, clay, kaolin, silicates, silica, alumina, marble, granite rock, soil, cement, human teeth.

Examples of metals are: Iron, steel, stainless steel, copper, brass, bronze, nickel, chrome, gold, silver.

All the above can be in the form of filaments, fibers, yarns, films, woven fabrics, felts, powders, solid objects, resins, liquids, solutions, emulsions, suspension.

In connection with the catalyzing of the sulfonation or the like, any soluble silver salt can be used, including silver nitrate, silver acetate, silver sulfate, silver carbonate and silver perchlorate. The concentration of the silver salt in the aqueous solution can vary within wide ranges, although it is preferably maintained at between about 0.01 to 1 percent by weight, and most preferably between about 0.05 to 0.1 percent.

The concentration of the alkali metal hydroxide, such as sodium hydroxide, which is used to precipitate the colloidal silver onto the surface of the substrate in the aqueous solution can also vary within wide ranges, although as practical convenience concentration is generally maintained at between about 0.5 percent and 5 percent by weight.

Utilizing the silver graft initiator a wide range of strong acids and strong bases or the like materials can be used for ionic grafting, in addition to the sulfonating agents and other agents mentioned above, such as anhydrous aluminum chloride, stannic chloride, ferric chloride, titanium tetrachloride, phosphorous pentoxide, antimony pentachloride, potassium alcoholates, sodium alcoholates, etc.

DESCRIPTION OF PREFERRED EMBODIMENTS

The following examples are given to further illustrate the invention. The scope of the invention is not, however, meant to be limited to the specific details of the examples.

EXAMPLE 1

A piece of fiberglass glass fabric is heated, cleaned and placed in a solution A, containing:
2 g silver nitrate in 1,000 cc water
for less than 1 second.
It is taken out, squeezed and placed in solution B, containing:
5 g sodium hydroxide in 1,000 cc water at 160°F
also for less than 1 second.
A slight tan colored fabric results which can be dried and stored for future use.

EXAMPLE 2

The fabric from Example 1 is placed in solution C containing:
20 g ethylene imine monomer and
80 g isopropyl alcohol
for less than 1 second and then
2 g conc hydrochloric acid are added.
An exothermic reaction takes place with the grafting of ethylene imine on the glass fabric in less than 1 second.

The fabric is taken out, washed in hot water thoroughly and dried.

It is then dyed conventionally using Pontacyl Blue 5R acid dye manufactured by DuPont. The fiberglass fabric accepts the dye readily to a deep shade, which is washfast and resistant to abrasion.

The electrostatic attraction of the negative acid dye to the positive ethylene imine is a proof of grafting.

EXAMPLE 3

A sample of polyvinyl chloride acetate film is treated first with the solutions of Example 1 then with the following solution:

5 g Sulfur trioxide (Sulfan, manufactured by Allied Chemical Corp.)

95 g Ethylene Dichloride, at room temperature for less than 1 second, then in a solution of:

Dimethylaminoethyl methacrylate at full concentration for less than 1 second.

A permanently dyeable film results when dyed with the same Pentacyl Blue 5R dye.

In addition the grafted vinyl film exhibits excellent water absorption as observed by a water drop test.

When a drop of water is deposited on the film and the film brought gradually to 90° the drop does not flow. The control, untreated film, sheds the water drop.

EXAMPLE 4

Similarly a sample of Polyvinylchloride film is grafted with sodium vinyl sulfonate. A negative charged graft is obtained in less than 1 second. It is dyed with Astrazon Blue B basic dye manufactured by Verona Dyestuffs.

EXAMPLE 5

A 30 g sample of polyisobutylene clear liquid resin is dissolved in 270 g heptane and treated with the following solution:

3 g chlorosulfonic acid
1 g tert butylhydroperoxide
5 g of acrylonitrile, mixed together and treated at 50°C for 2 hrs. The reaction is complete. The product is precipitated with acetone and dissolved in benzene. This procedure is repeated 3 times. The thus purified product is subjected to Kjeldahl analysis and shows a constant amount of nitrogen at 4 percent, or 15 percent of grafted acrylonitrile.

EXAMPLE 6

A sample of polyvinylchloride film is treated in a solution of:

5 g of Sulfur trioxide
95 g Ethylene dichloride
for less than 1 second and washed in water.

Then as per Example 1 in silver nitrate solution and sodium hydroxide solution, for less than 1 second each.

It is then washed with water and placed in the following solution:

27 g dimethylaminoethyl methacrylate
60 g dimethylformamide
15 g of glacial acetic acid
15 g benzyl chloride
45 cc water The solution with the film in it is brought to 160°–180°F and the following cayalysts added:

0.6 g t-butylhydroperoxide in 1 cc dimethylformamide and 0.2 g ammonium persulfate in 1 cc water After 2 minutes the reaction is completed, the film taken out and washed. It is now grafted with quaternary ammonium groups and possesses a strong positive charge as evidenced by the dyeability with acid dyes.

EXAMPLE 7

The same procedure is followed as Example 6 except that the monomer solution is prepared as follows:

40 g sodium vinylsulfonate
120 cc water
200 g dimethyl formamide
3 g glacial acetic acid
20 g glycidyl methacrylate
1.5 g ammonium persulfate in 3 cc water.

The film is placed in the solution and the solution maintained at 160°F for 2 minutes, washed in water and dried in air. A grafted film results which is permanently dyeable with basic dyes.

While the invention has been described in particular with respect to the pretreatment of certain specific polymeric materials and the grafting of certain specific monomers thereon, it is to be understood that variations and modifications of the invention can be made without departing from the spirit or scope of the invention.

What is claimed is:

1. Method of activating a surface of a polymeric material so as to render the same amenable to further treatment such as dyeing, which comprises treating said polymeric material with an aqueous solution of a water soluble silver salt and with a strong base whereby colloidal silver becomes deposited on the surface of said polymeric material, and subjecting the thus pretreated of said polymeric material to the action of a strongly ionic agent selected from the group consisting of strong acids and strong bases while in contact with a hydrocarbon solvent, whereby the corresponding ion from said strongly ionic material is grafted onto the thus pretreated surface of said polymeric material, rendering the same easily reactable with reactive agents such as dyes.

2. Method according to claim 1 wherein said silver salt is selected from the group consisting of silver nitrate, silver acetate, silver sulfate, silver carbonate and silver perchlorate.

3. Method according to claim 2 wherein said strong base is an alkali metal hydroxide.

4. Method according to claim 3 wherein said hydrocarbon solvent is a chlorinated hydrocarbon.

5. Method according to claim 4 wherein said strongly ionic agent is a sulfonating agent.

6. Method according to claim 5 wherein said polymeric material is selected from the group consisting of polyolefins, polyesters and polyvinylchlorides.

7. Method according to claim 6 wherein said chlorinated hydrocarbon is selected from the group consisting of ethylene dichloride, methylene dichloride, triethylene chloride, carbon tetrachloride, methyl chloride, chlorobenzene and dichlorobenzene.

8. Method according to claim 7 wherein a polymerizable monomer is then grafted onto the thus treated polymeric material.

9. Method according to claim 7 wherein the thus treated polymeric material is then subjected to dyeing.

* * * * *